United States Patent
Holmes

(10) Patent No.: US 6,806,678 B2
(45) Date of Patent: Oct. 19, 2004

(54) BATTERY CHARGER

(75) Inventor: David D. Holmes, Colbert, WA (US)

(73) Assignee: Relion, Inc., Spokane, WA (US)

( * ) Notice: Subject to any disclaimer, the term of this patent is extended or adjusted under 35 U.S.C. 154(b) by 0 days.

(21) Appl. No.: 10/371,855

(22) Filed: Feb. 20, 2003

(65) Prior Publication Data

US 2004/0164702 A1 Aug. 26, 2004

(51) Int. Cl.$^7$ ............................................. H01M 10/44
(52) U.S. Cl. ..................................................... 320/101
(58) Field of Search .............................. 320/101, 138; 429/22, 23, 13, 12; 701/22, 60, 65; 702/57, 60, 62, 63

(56) References Cited

U.S. PATENT DOCUMENTS

| | | | |
|---|---|---|---|
| 6,030,718 A | 2/2000 | Fuglevand et al. | ............ 429/26 |
| 6,096,449 A | 8/2000 | Fuglevand et al. | ............ 429/13 |
| 6,468,682 B1 | 10/2002 | Fuglevand et al. | ............ 429/26 |
| 6,503,649 B1 * | 1/2003 | Czajkowski et al. | .......... 429/23 |

* cited by examiner

Primary Examiner—Pia Tibbits
(74) Attorney, Agent, or Firm—Wells St. John, P.S.

(57) ABSTRACT

A battery charger for use with a battery, and which is provided with a first charging current to substantially maintain the electrical charge of the battery is described and which includes a plurality of fuel cell modules which supply a second charging current for substantially maintaining the charge of the battery; and a controller electrically coupled with the plurality of fuel cell modules, and wherein upon interruption of the first charging current, the controller operably delivers the second charging current to the battery.

10 Claims, 4 Drawing Sheets

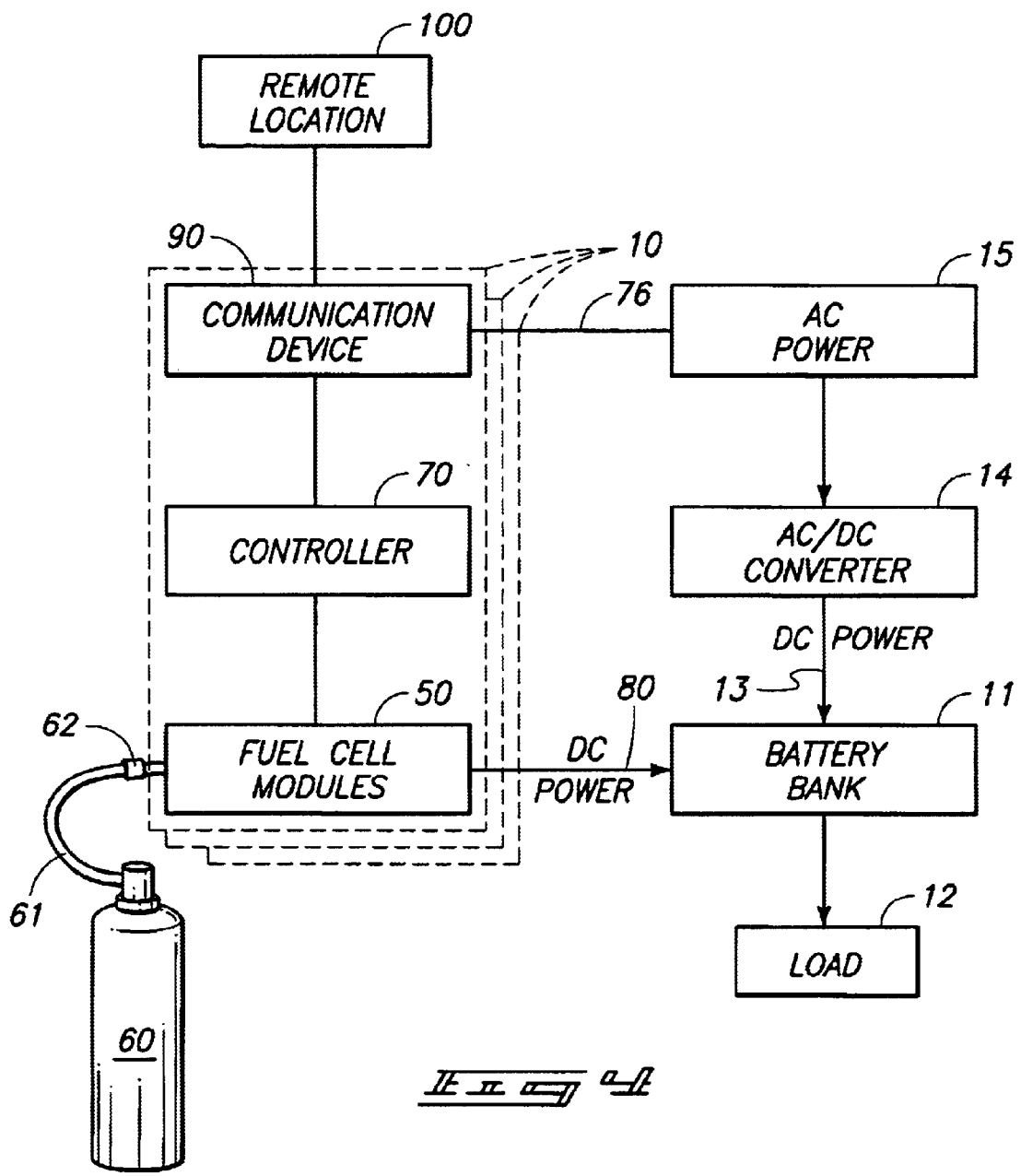

BATTERY CHARGER

TECHNICAL FIELD

The present invention relates to a battery charger for use in electrically charging batteries, and more specifically to a battery charger which includes a plurality of fuel cell modules which provide a charging current for substantially maintaining the charge of the battery, and a controller which delivers the charging current to the battery under predetermined operational conditions.

BACKGROUND OF THE INVENTION

In assorted commercial and industrial applications, uninterruptible power supplies are necessary in order to maintain crucial systems in an operational state notwithstanding the loss of a primary electrical power source. For example, navigation sites; communication repeater sites; mission critical computer systems; and even railroad crossing signals must be fully operational 24 hours a day in order to prevent injuries, accidents, or interruptions in industrial and commercial processes or business operations.

Heretofore, user's desiring to have uninterruptible power supplies for critical or mission essential operations have typically utilized battery banks and/or stand-by generator sets which provide electrical power upon the interruption of the primary AC power source.

Typically these uninterruptible power supplies which have battery banks include a charging assembly which maintains the battery or bank of batteries in a fully charged state so that they may be ready to deliver electrical power upon an interruption of the primary power source.

While this arrangement has worked with some degree of success, it has several shortcomings which have detracted from its usefulness. One of the chief problems with this type of uninterruptible power supply is that the charging assembly utilized to maintain a battery bank in a fully charged condition often receives it's power from the primary electrical power source that normally serves the load. As a result, if the primary power source is interrupted, the charging assembly no longer provides a charging current to the batteries. Consequently, if the battery bank is called upon to deliver power over a prolonged period of time, and without a charging assembly providing an electrical current to recharge the batteries, the battery bank often becomes deeply discharged. Those skilled in the art will recognize that batteries that are often cycled through deep electrical discharges often experience shortened operational lifetimes. Still further, another shortcoming in this same arrangement, is that a charging assembly can occasionally malfunction with the result that the current capacity of the battery bank becomes degraded.

As will be recognized, in extremely critical industrial, commercial or other applications, this may be a completely intolerable situation.

A battery charger which addresses these and other perceived shortcomings in the prior art practices is the subject matter of the present application.

SUMMARY OF THE INVENTION

A first aspect of the present invention relates to a battery charger for use with a battery and which is provided with a first charging current to substantially maintain the electrical charge of the battery and which includes, a plurality of fuel cell modules which provide a second charging current for substantially maintaining the charge of the battery; and a controller electrically coupled with the plurality of fuel cell modules, and wherein upon interruption of the first charging current, the controller operably delivers the second charging current to the battery.

Another aspect of the present invention relates to a battery charger for use with a battery and which is provided with a first charging current which is supplied by way of an AC to DC converter which is electrically coupled with an AC power source, the battery charger including a housing defining a cavity and which further includes an air plenum which is coupled in fluid flowing relation relative to the cavity; an electrical bus borne by the housing and which is positioned in the cavity of the housing; a source of a fuel gas coupled in fluid flowing relation relative to the cavity; a plurality of fuel cell modules which, when rendered operational, produce a second charging current for substantially maintaining the electrical charge of the battery, and heat energy, and wherein the plurality of fuel cell modules are received within the cavity of the housing and are individually electrically coupled with the electrical bus and disposed in fluid flowing relation relative to the source of fuel gas, and wherein the individual fuel cell modules may be electrically decoupled from the electrical bus and removed from the housing while the remaining fuel cell modules continue in operation; an air movement assembly borne by the housing and which is coupled in fluid flowing relation relative to the air plenum, and wherein the air plenum delivers a cathode air stream by way of the air plenum and which removes a preponderance of the heat energy generated during operation of the plurality of fuel cell modules; a controller borne by the housing and which is controllably electrically coupled with the plurality of fuel cell modules, the electrical bus and the air movement assembly, and wherein the controller is electrically coupled with the AC power source, and is further disposed in controlling relation relative to the source of fuel gas; and a communications device electrically coupled to the controller and which is responsive to an electrical signal sent from a remote location, and wherein the controller operably delivers the second charging current to the battery upon interruption of the AC power source.

Yet another aspect of the present invention relates to a method of charging a battery, and which includes providing a source of AC power; providing an AC to DC converter and supplying the source of AC power to the AC to DC converter to produce a first charging current; supplying the first charging current to maintain the charge of the battery; providing a plurality of fuel cell modules, which when rendered operable, produces a second charging current; providing a controller which is electrically coupled with the AC power source, and which is further disposed in controlling relation relative to the plurality of fuel cell modules; and delivering the second charging current to the battery when the controller senses interruption of the AC power source.

BRIEF DESCRIPTION OF THE DRAWINGS

Preferred embodiments of the invention are described below with reference to the following accompanying drawings.

FIG. 4 is a greatly simplified block diagram which illustrates one possible way of deploying the battery charger of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
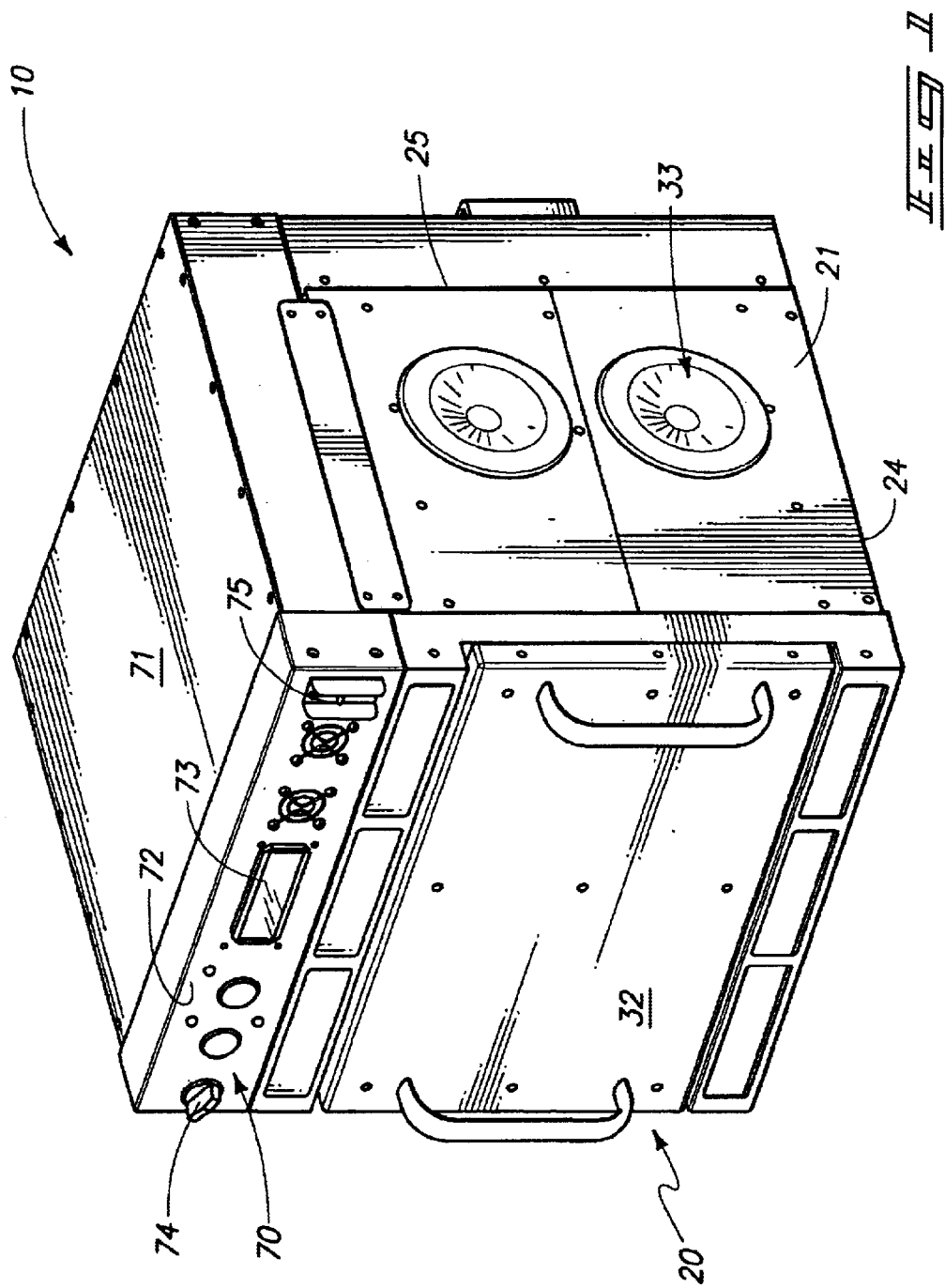
FIG. 1 is a perspective, environmental view of a battery charger which employs the teachings of the present invention.
Figure 2:
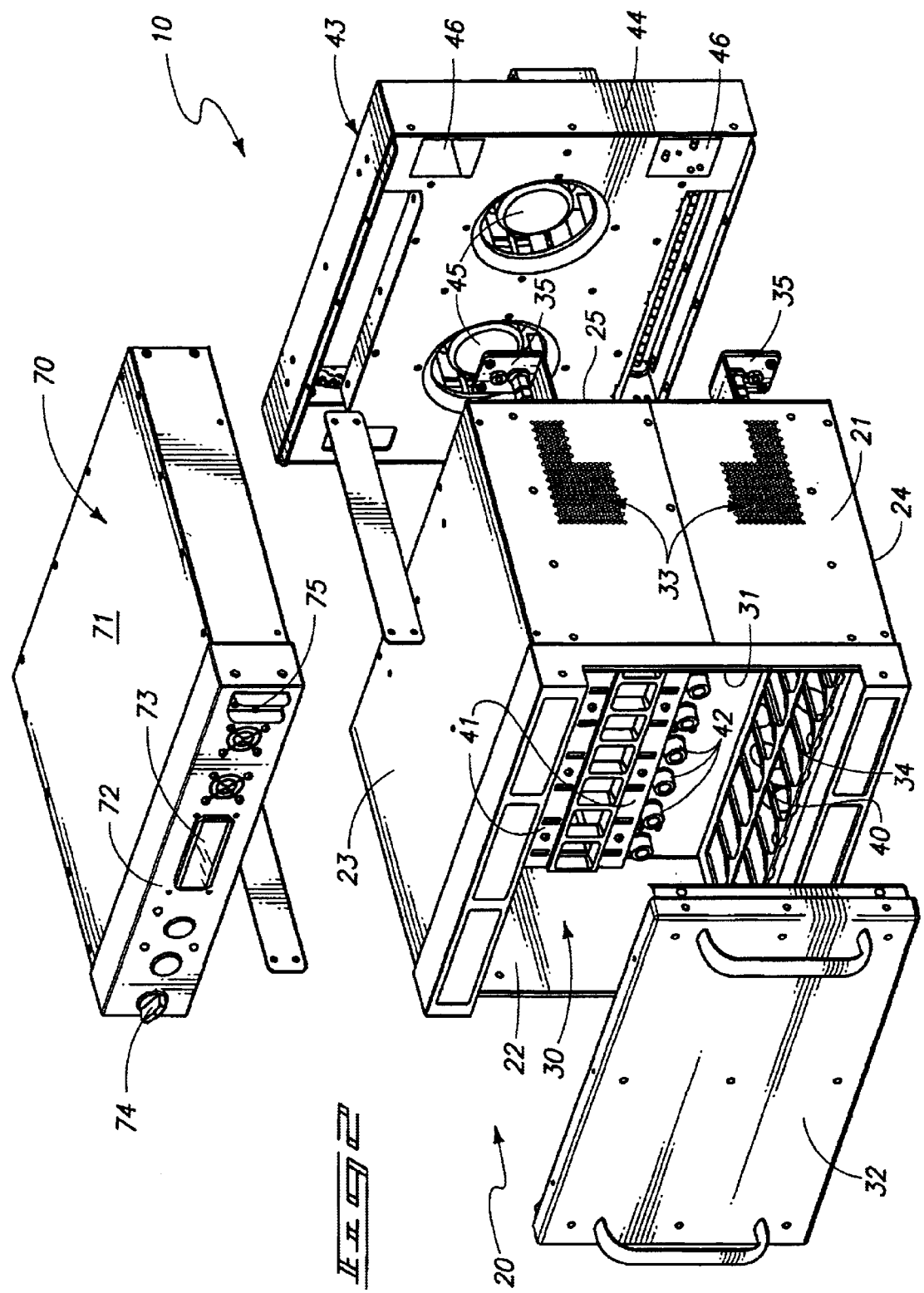
FIG. 2 is an exploded, fragmentary, perspective view of a battery charger employing the teachings of the present invention.

The battery charger of the present invention is generally indicated by the numeral 10 in FIGS. 1, 2 and 4. As seen most clearly by reference to FIG. 4, the battery charger 10 is selectively electrically coupled with a battery or a battery bank 11. The battery or battery bank 11 is selectively electrically coupled to a load 12 when the primary electrical power source for the load 12 is interrupted. As seen further in that drawing, the battery or battery bank 11 is provided with a first charging current which is generally indicated by the numeral 13. This DC power or first charging current 13 is provided or supplied by way of an AC to DC converter or rectifier 14. As should be understood, the AC to DC converter is supplied with AC power from a primary AC power source 15. From this AC power source the rectifier or AC to DC converter produces the first charging current or DC power source 13 which maintains the battery or battery bank 11 in a substantially fully charged electrical state under most conditions.

Referring now to FIGS. 1 and 2, the battery charger 10 of the present invention includes a housing which is generally indicated by the numeral 20. The housing includes first and second sidewalls 21 and 22 which are each spaced in predetermined substantially parallel relation one relative to the other. The first and second sidewalls are joined together by top and bottom surfaces 23 and 24, respectively. Still further, a rearward facing surface 25 is provided, and which results in the formation of a substantially rectangular shaped enclosure. The sidewalls 21 and 22, and the top, bottom and rearward facing surfaces 23, 24, and 25 define an internal cavity 30. As seen in FIG. 2, the sidewalls, top, bottom and rearward facing surfaces define an opening or aperture generally indicated by the numeral 31. A door 32 is provided and which is hingedly mounted on one of the sidewalls and which permits an operator to substantially occlude the opening or aperture 31. As seen in FIG. 1, ventilation apertures 33 are formed in the first sidewall 21 and provide a means by which heat generated during operation of the battery charger 10 may escape from the internal cavity 30. As seen in FIG. 2, a supporting surface 34 is received in the internal cavity 30 and is mounted in predetermined substantially parallel spaced relationship relative to the bottom surface 24. Yet further, a plurality of mounting flanges 35 extend substantially normally rearwardly relative to the rearwardly facing surface 25 and are operable to engage a fan assembly which will be discussed in greater detail hereinafter.

As seen in FIG. 2, the housing 20 defines an internal air plenum 40, one end of which terminates at the supporting surface 34. The air plenum is designed to allow the circulation of ambient air through the internal cavity 30 to provide oxygen which is consumed by the battery charger 10, and to further remove heat energy which is generated as a by-product of the operation of the battery charger 10. Still further, and mounted within the internal cavity 30 is an electrical bus which is generally indicated by the numeral 41 and which permits a plurality of fuel cell modules, which will be discussed in greater detail hereinafter, to be releasably electrically coupled thereto. As seen in the drawings, and mounted below the electrical bus, are fuel gas supply outlets 42 which permit the fuel cell module to be coupled with a source of a fuel gas which will also be discussed in greater detail hereinafter. As seen in the exploded view of FIG. 2, an air movement assembly 43 is releasably attached to the rearward facing surface 25 of the housing 20. The air movement assembly 43 is constructed in a modular fashion such that it may be readily disconnected from the housing 20 in order to provide increased opportunities to service the assembly and the internal components of the battery charger 20. As seen in the drawings, the air movement assembly 43 includes a housing 44 which mounts a pair of fans which are generally indicated by the numeral 45. The fans 45, when energized, are operable to produce a flow of ambient air which is delivered to the air plenum 40, and which circulates through the internal cavity 30 in order to provide oxygen which is consumed by the fuel cell modules, and remove heat energy generated as a result of the battery charger operation. As seen in FIG. 2, a plurality of channels or passageways 46 are defined by the housing 44 and are operable to releasably mate with the mounting flanges 35 which extend normally outwardly relative to the rear surface 25 of the housing 20.

Figure 3:
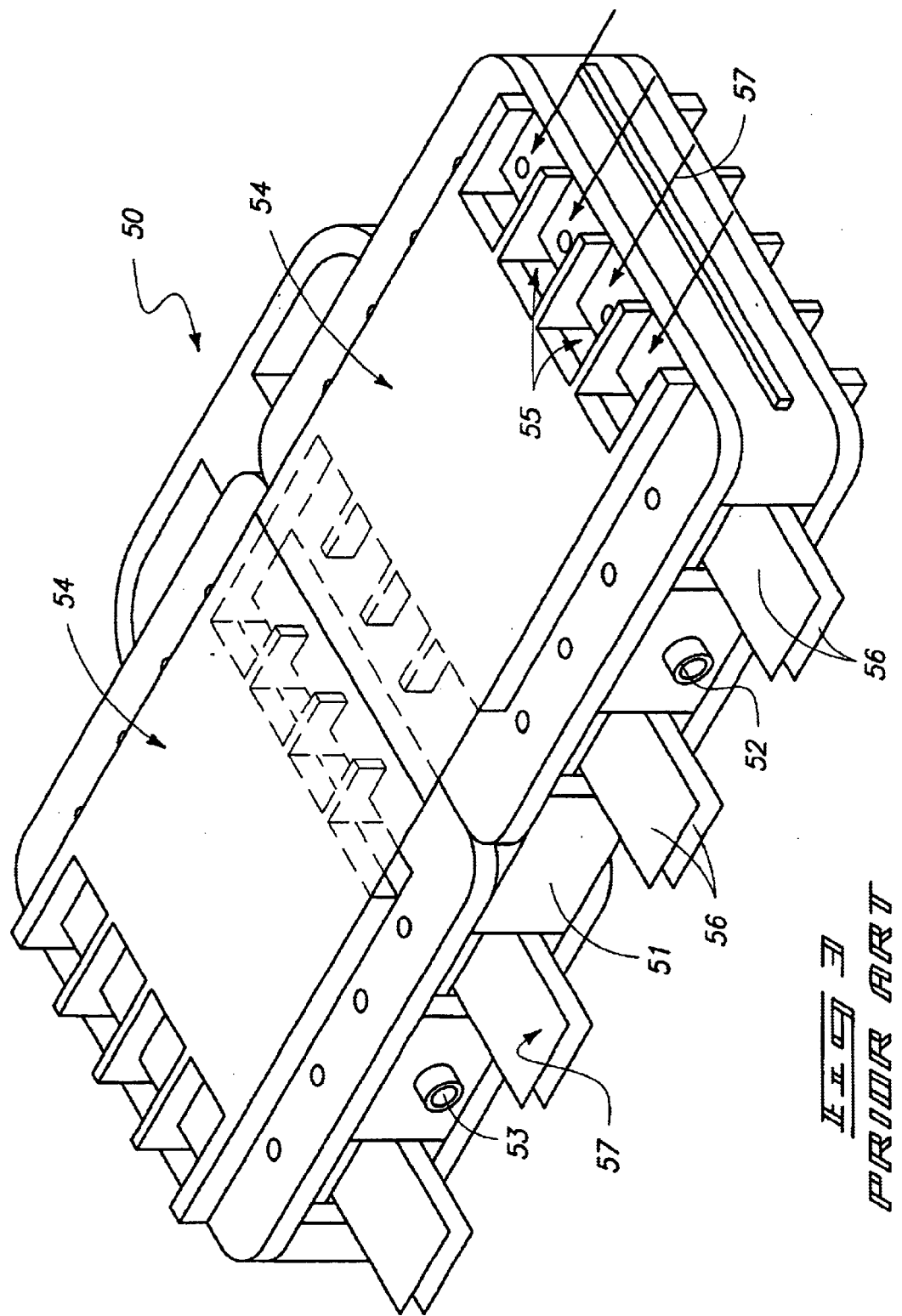
FIG. 3 is a perspective, side-elevation view of an ion exchange membrane fuel cell module which finds usefulness in the battery charger of the present invention.

Referring now to FIG. 3, an ion exchange membrane fuel cell module is generally indicated by the numeral 50. The fuel cell module, as illustrated, is discussed in significant detail in U.S. Pat. No. 6,030,718, the teachings of which are incorporated by reference herein. As a general matter, the battery charger 10 of the present invention mounts a plurality of fuel cell modules within the internal cavity 30 and which collectively produce electrical power which is provided in the form of a second charging current to the battery or battery bank 11 as will be discussed in greater detail hereinafter. The respective fuel cell modules 50 as shown, each have a main body 51 which defines opposing cavities (not shown), and which receive individual membrane electrode diffusion layer assemblies. The membrane electrode diffusion layer assemblies each have opposite anode and cathode sides (not shown). The anode sides face inwardly towards these cavities defined by the main body 51 and the cathode sides face outwardly so that they may be exposed to a stream of ambient air which passes over the surface thereof and which is provided by way of the air movement assembly 43. As should be understood by a study of FIG. 3, multiple modules 50 are combined together in the internal cavity 30. The battery charger 10 is arranged such that at least one of the fuel cell modules 50 can be operationally disabled, and removed from service, by hand, while the remaining fuel cell modules 50 continue to operate. In this regard, during operation of the battery charger 10, the respective fuel cell modules 50 produce heat energy. Additionally, each fuel cell module 50 is provided with an air flow by way of the air plenum 40. As discussed above, the air movement assembly 43 by moving ambient air (oxygen) through the cavity 30 regulates the operational temperature of each of the fuel cell modules by removing a preponderance of the heat energy therefrom and further provides an oxidant supply to support the operation of the fuel cell modules 50.

Referring still to FIG. 3, the ion exchange membrane fuel cell module 50 has a fuel intake or delivery port 52 which is formed in the main body 51, and which supplies a fuel gas, as will be discussed below, to the anode sides of the respective membrane electrode diffusion layer assemblies which are enclosed therein. Still further, the main body 51 defines a by-product exhaust port 53 which removes waste water, unreacted fuel gas, and any resulting by-products from the anode and cathode sides of the membrane electrode diffusion layer assemblies which are enclosed therein. As should be understood, the fuel intake port 52 is coupled in releasable fluid flowing relation relative to the fuel gas outlets 42 as seen in FIG. 3. In addition, cathode covers 54 cooperate with the main body 51 and exert force on adjacent current collectors 56 which are placed into ohmic electrical contact relative to the individual membrane electrode diffusion layer assemblies which are enclosed therein. The respective current collectors 56 are electrically coupled to the electrical bus 41 when the individual fuel cell modules are received in the internal cavities 30. As seen in FIG. 3, the cathode covers 54 define cathode air passageways 55 which allow a stream of air (oxygen) provided by the air movement assembly 43 to move therethrough and into contact with the cathode sides of the membrane electrode diffusion layer assembly. In this arrangement, a cathode air flow 57 which is derived from the stream of air provided by the air movement assembly 43 is operable to remove a preponderance of the heat energy generated during ion exchange membrane fuel cell module 50 operation as well as support fuel cell module operation. The current collectors 56 each have an electrically conductive tab or member 57 which extends outwardly relative to the main body 51, and which may be selectively electrically coupled with the electrical bus as discussed above.

As seen in FIG. 4, the battery charger 10 and more specifically the plurality of fuel cell modules 50 are coupled in fluid flowing relation relative to a source of a fuel gas which is generally designated by the numeral 60. The source of fuel gas shown herein can be, for example, commercially available bottled hydrogen, or may further include a source of fuel gas which is provided by way of a reformer and which produces an appropriate stream of fuel gas from another hydrocarbon source, and which can be consumed by the respective fuel gas modules 50.

As seen in FIGS. 1, 2 and 4, the battery charger 10 includes a controller which is generally indicated by the numeral 70. As seen, the controller 70 is borne by the housing 20 and is controllably electrically coupled with a plurality of fuel cell modules 50; the electrical bus 41; and the air movement assembly 43. Still further, and as seen in FIG. 4, the controller is electrically coupled with the AC power source 15, by way of a sensing line 76 and is further disposed in controlling relation relative to the source of fuel gas 60 by way of a valve assembly 62. As seen in FIG. 2, the controller 70 includes a housing 71 which is releasably mounted to the top surface 23 of the housing 20, and further includes a control panel 72, which includes a liquid crystal display 73. The liquid crystal display provides various information regarding the operational conditions of the battery charger 10. Still further, a selector switch 74 is provided, and which allows an operator to choose a variety of operational conditions for the battery charger 10. Yet further, an emergency shut-off switch 75 is provided and which allows an operator to deactivate the battery charger 10 in the event of malfunction. As seen in FIG. 4, the controller may also include circuitry or subassemblies, not shown, and which permits it to act as a multiple system controller. This multiple system controller would be electrically coupled to a plurality of battery chargers 10. In this kind of arrangement, the multiple battery chargers 10 would provide a second charging current 80 to the battery or battery bank 11 upon interruption of the AC power source 15.

As seen in FIG. 4, a communications device which is generally indicated by the numeral 90 is made integral or is electrically coupled with the controller 70. The communications device is further disposed in sensing relation relative to the AC power source 15, and to a remote location which is generally indicated by the numeral 100. In the arrangement as shown, the communications device 90 is electrically coupled to the controller 70 and is responsive to an electrical signal sent from the remote location 100. In this arrangement, the controller 70 is operable to deliver the second charging current 80 to the battery upon interruption of the AC power source 15 or upon receiving an electrical signal from the remote location.

The communication device 90 as described above may be a receiver; a transmitter or a transmitter/receiver. The communications device provides an effective means by which a user from a remote location 100 may control the operation of the battery charger 10; monitor its operation; or periodically poll it to determine its readiness status. The battery charger 10 as discussed herein provides therefore a plurality of fuel cell modules 50 which produce a second charging current 80 for substantially maintaining the electrical charge of the battery or battery bank 11. Still further, the controller 70 is electrically coupled with the plurality of fuel cell modules 50, and upon interruption of the first charging current 13, as would be sensed by way of the sense line 76, the controller operably delivers the second charging current 80 to the battery or battery bank 11. As presently conceived, and as shown in the drawings, the battery charger 10 of the present invention weighs less than about 80 pounds. The controller 70 is electrically coupled to the AC power source 15 such that upon interruption of the AC power source 15 or receiving a signal from a remote location 100, the controller operably delivers the second charging current 80 to the battery or battery bank 11. This present invention may also be utilized as a stand-alone primary battery charging device providing that it is continuously supplied with an appropriate amount of fuel gas.

As will be appreciated by a study of FIG. 4, and as described above, the battery charger 10 may be operated from a remote location 100 and wherein an electrical signal generated from the remote location 100 causes the controller 70 to operably deliver the second charging current 80 to the battery 11. The electrical signal received from the remote location can also cause the controller 70 to discontinue delivery of the second charging current 80 to the battery 11. Still further, the electrical signals provided from the remote location can cause the controller 70 to operably deliver a portion of the second charging current 80 to the battery 11. This proportional delivery may be in an amount that is in proportional relation relative to the fractional amount of the first charging current 13 being provided to the battery or battery bank 11. As will be appreciated, the battery charger 10 by way of the controller 70 is operable to deliver a second charging current 80, not only upon the complete failure of the first charging current 13, but also upon a degrading or reduction of the AC power source 15. In this regard, the amount of the second charging current 80 may be provided in an amount which substantially equals the amount of degrading or reduction of the AC power 15 which is being delivered to the AC to DC converter 14. As presently described, the battery charger 10 normally will produce a second charging current output 80 of about 100 to about 2,000 watts upon a complete interruption of the charging current 13. As will be appreciated, therefore, the interruption of the first. charging current 13 may constitute a substantially complete or partial elimination of the AC power source 15. As earlier noted, the controller is operable to deliver a portion of the second charging current which is substantially equal to an amount of the AC power which has been partially eliminated. The controller 70 is also operable through the communications device 90 to provide a signal to a remote location to indicate the operational condition of the fuel cell or otherwise report on the operational performance of the fuel cell modules 50. As a result, an operator may from the remote location 100, poll or otherwise inquire as to the status of the operation of the battery charger or the operational conditions of the respective fuel cell modules 50.

Operation

The operation of the described embodiment of the present invention is believed to be readily apparent and is briefly summarized at this point.

A first aspect of the present invention relates to a battery charger 10 for use with a battery or battery bank 11, and which is provided with a first charging current 13 to substantially maintain the electrical charge of the battery or battery bank 11. The present battery charger 10 weighs less than about 80 pounds and has a power output of about 100 to about 2,000 watts. In this regard, the battery charger 10 includes a plurality of fuel cell modules 50, which provides a second charging current 80 for substantially maintaining the charge of the battery or battery bank 11; and a controller 70 coupled with the plurality of fuel cell modules 50. Upon interruption of the first charging current 13, the controller 70 operably delivers the second charging current 80 to the battery.

More specifically, the battery charger 10 of the present invention is provided with a first charging current 13 which is provided by way of an AC to DC converter 14. The AC to DC converter is electrically coupled with an AC power source 15. The battery charger 10 includes a housing 20 which defines a cavity 30, and which further includes an air plenum 40 which is coupled in fluid flowing relation relative the cavity 30. An electrical bus 41 is borne by the housing 20, and is positioned in the cavity 30 of the housing 20. A source of a fuel gas 60 is coupled in fluid flowing relation relative to the cavity. A plurality of fuel cell modules 50 are provided and which, when rendered operational, produce a second charging current 80 for substantially maintaining the electrical charge of the battery 11. The plurality of fuel cell modules 50 further produce heat energy during operation. The plurality of fuel cell modules 50 are received within the cavity 30 of the housing 20 and are individually electrically coupled with the electrical bus 41 and disposed in fluid flowing relation relative to the source of fuel gas 60. The individual fuel cell modules 50 may be electrically decoupled from the electrical bus 41 and removed from the housing 20 while the remaining fuel cell modules 50 continue in operation. An air movement assembly 43 is provided and is borne by the housing 20 and which is coupled in fluid flowing relation relative to the air plenum 40. As earlier discussed, the air plenum 40 delivers a cathode air stream 57 by way of the air plenum 40 and further removes a preponderance of the heat energy generated during the operation of the plurality of fuel cell modules 50. A controller 70 is borne by the housing 20 and is controllably electrically coupled with the plurality of fuel cell modules 50; the electrical bus 41; and the air movement assembly 43. The controller is further electrically coupled with the AC power source 15, and is further disposed in controlling relation relative to the source of fuel gas 60. A communications device 90 is electrically coupled to the controller 70 and is further responsive to an electrical signal sent from a remote location 100. The controller 70 operably delivers the second charging current 80 to the battery 11 upon interruption of the AC power source 15.

The present invention also provides a method of charging a battery 11 which includes providing an AC power source 15; providing an AC to DC converter 14 and supplying the source of AC power source to the AC to DC converter to produce a first charging current 13; supplying the first charging current 13 to maintain the charge of the battery or battery bank 11; providing a plurality of fuel cell modules 50, which, when rendered operational, produces a second charging current 80; providing a controller 70 which is electrically coupled with the AC power source 15, and which is further disposed in controlling relation relative to the plurality of self hydrating fuel cell modules 50 which are more fully described in U.S. Pat. No. 6,030,718; and delivering the second charging current 80 to the battery 11 when the controller senses interruption of the AC power source 15.

Therefore, it will be seen that the present invention provides many advantages over the prior art practice and insures that a back-up power supply such as a battery or battery bank 11 may be in a fully charged and ready state in order to service a load under all operational conditions and notwithstanding interruption of a primary charging current which normally is provided to same.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A battery charger comprising:

a battery to be charged:

a source of AC power which is electrically coupled with the battery charger;

an AC to DC converter electrically coupled to the AC power source and which produces a first charging circuitry which is supplied to the battery to be charged;

a housing defining a cavity and which further includes an air plenum which is coupled in fluid flowing relation relative the cavity;

an electrical bus borne by the housing and which is positioned in the cavity of the housing;

a source of a fuel gas coupled in fluid flowing relation relative to the cavity;

a plurality of fuel cell modules which produce a second charging current which is supplied to the battery, and heat energy, and wherein the plurality of fuel cell modules are received within the cavity of the housing and are individually electrically coupled with the electrical bus, and disposed in fluid flowing relation relative to the source of fuel gas, and wherein the individual fuel cell modules may be selectively electrically decoupled from the electrical bus and removed from the housing while the remaining fuel cell modules continue in operation;

an air movement assembly borne by the housing and which is coupled in fluid flowing relation relative to the air plenum, and wherein the air plenum delivers a cathode air stream to the respective fuel cell modules by way of the air plenum, and wherein the cathode air stream removes a preponderance of the heat energy generated during operation of the plurality of fuel cells;

a controller borne by the housing and which is controllably electrically coupled with the plurality of fuel cell modules, the electrical bus and the air movement assembly, and wherein the controller is electrically coupled with the AC power source, and is further disposed in controlling relation relative to the source of fuel gas; and a communications device electrically coupled to the controller and which is responsive to an electrical signal sent from a remote location, and wherein the controller operably delivers the second charging current to the battery upon substantial termination of the first charging current as occasioned by the interruption of the AC power source.

2. A battery charger as claimed in claim 1, and wherein the controller is enclosed within an enclosure which is mounted on the housing.

3. A battery charger as claimed in claim 2, and wherein the air movement assembly is enclosed within a second enclosure which is mounted on the housing.

4. A battery charger as claimed in claim 3, and wherein the first and second enclosures are releasably coupled to the housing.

5. A battery charger as claimed in claim 1, and wherein the controller includes a multiple system controller which is electrically coupled to a plurality of battery chargers, and wherein the plurality of battery chargers collectively produce the second charging current.

6. A battery charger as claimed in claim 1, and wherein the second charging circuit generated by the plurality of fuel cell modules can be adjusted.

7. A battery charger as claimed in claim 1, and wherein the communication device is a receiver, and wherein the electrical signal received by the controller causes the delivery of the second charging current to the battery.

8. A battery charger as claimed in claim 1, and wherein the interruption of the AC power source is a substantially complete elimination of the AC power source.

9. A battery charger as claimed in claim 1, and wherein the interruption of the AC power source is a reduction of the AC power source.

10. A battery charger as claimed in claim 1, and wherein the communications device includes a transmitter and a receiver, and wherein the controller is operable by way of the transmitter to send an electrical signal to a remote location and which indicates an operational condition of the battery charger.

* * * * *